(12) United States Patent
Outhavong

(10) Patent No.: US 10,421,606 B2
(45) Date of Patent: Sep. 24, 2019

(54) DEBRIS BUNDLING DEVICE

(71) Applicant: Sounthaly Outhavong, Austin, TX (US)

(72) Inventor: Sounthaly Outhavong, Austin, TX (US)

(*) Notice: Subject to any disclaimer, the term of this patent is extended or adjusted under 35 U.S.C. 154(b) by 0 days.

(21) Appl. No.: 15/808,875

(22) Filed: Nov. 9, 2017

(65) Prior Publication Data

US 2018/0222671 A1 Aug. 9, 2018

Related U.S. Application Data

(60) Provisional application No. 62/420,469, filed on Nov. 10, 2016.

(51) Int. Cl.
| | |
|---|---|
| *B32B 3/08* | (2006.01) |
| *B65F 1/00* | (2006.01) |
| *B32B 7/12* | (2006.01) |
| *B32B 3/26* | (2006.01) |

(52) U.S. Cl.
CPC ............... *B65F 1/00* (2013.01); *B32B 3/08* (2013.01); *B32B 3/266* (2013.01); *B32B 7/12* (2013.01); *B65F 1/0006* (2013.01); *B65F 2240/138* (2013.01); *B65F 2250/105* (2013.01); *B65F 2250/108* (2013.01); *B65F 2250/114* (2013.01); *Y10T 428/24008* (2015.01)

(58) Field of Classification Search
CPC ... Y10T 428/24008; B32B 3/08; B32B 3/266; B65F 1/00; B65F 2240/138
See application file for complete search history.

(56) References Cited

U.S. PATENT DOCUMENTS

| | | | | |
|---|---|---|---|---|
| 2007/0184239 A1* | 8/2007 | Mallory | ................. | B32B 29/02 428/99 |
| 2008/0205973 A1* | 8/2008 | Drawdy | ................. | A01D 51/00 402/80 L |

FOREIGN PATENT DOCUMENTS

DE  20312214  * 10/2003

* cited by examiner

*Primary Examiner* — Alexander S Thomas
(74) *Attorney, Agent, or Firm* — Cesari & Reed LLP; R. Michael Reed

(57) ABSTRACT

In some embodiments, a debris bundling device can include a substrate including at least one edge. The substrate may be formed from a flexible material. The debris bundling device may further include a plurality of strings and a plurality of fasteners coupled to the substrate. Each string may include a first end coupled to the substrate and may include a second end. Each fastener may be configured to engage the second end of one of the plurality of strings to secure the substrate in a wrapped state.

17 Claims, 11 Drawing Sheets

DEBRIS BUNDLING DEVICE

CROSS-REFERENCE TO RELATED APPLICATION(S)

The present application is a non-provisional of and claims priority to U.S. Provisional Patent Application No. 62/420,469 filed on Nov. 10, 2016 and entitled "Debris Bundling Device", which is incorporated herein by reference in its entirety.

FIELD

The present disclosure is generally related to devices for bundling lawn debris, such as branches, twigs, and other trimmings, and more particularly to a disposable, biodegradable substrate with fasteners configured to secure such debris for handling and disposal.

BACKGROUND

Yard debris, such as tree and shrub trimmings, can be difficult to package for removal and disposal. Yard debris bags may be formed from paper and may have an opening that is sized to fit a lawn mower bag for receiving grass clippings; however, such bags can be difficult to use for disposal of branches and twigs. In particular, the branches and twigs tend to catch on the opening of the bag, and forcing the branches into the bag can cause the bag to tear. Thus, the user may need to spend time cutting the trimmings down to fit into the bag opening.

SUMMARY

In some embodiments, a bundling device may include a substrate formed from a flexible, recyclable, biodegradable material, such as paper, biodegradable plastic, a woven fabric, or another material. Further, the bundling device may include a plurality of strings coupled to the substrate at a first location and a corresponding plurality of fasteners at a second location. The bundling device can be configured to be wrapped around yard debris and the strings may be coupled to the fasteners to bundle the yard debris for disposal.

In some embodiments, a bundling device may include a flexible substrate coupled to a plurality of fasteners and a corresponding plurality of strings. The fasteners may be configured to engage and secure the corresponding strings to wrap the flexible substrate around debris, such as sticks, twigs, branches, and other yard debris. In some embodiments, the fasteners may include one or more disks (which may be round, rectangular, elliptical, or another shape), one or more slits through at least a portion of the flexible substrate, or another type of fastener. In some embodiments, the plurality of strings may consist of slender lengths of flexible material such as jute, cotton, paper, or other types of recyclable, biodegradable material.

In some embodiments, a debris bundling device may include a substrate, a plurality of strings, and a plurality of fasteners. The substrate may be formed from a flexible material and may have a substantially rectangular shape including a plurality of edges. Each of the plurality of strings may include a first end and a second end. The first end may be coupled to the substrate adjacent to a first edge of the plurality of edges. Each of the plurality of fasteners may be coupled to the substrate adjacent to a second edge of the plurality of edges and may be configured to engage the second end of one of the plurality of strings to secure the substrate in a wrapped state.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of a bundling device are described below that can include a flexible, recyclable, biodegradable substrate, which may be formed from one or more layers of biodegradable material. The bundling device may have at least one edge and may be formed in a variety of shapes and sizes. Further, the bundling device may include a plurality of strings or cords coupled to the flexible substrate near the edge and may include a corresponding plurality of fasteners on an opposite side (or edge) of the substrate. The plurality of strings may consist of slender lengths of flexible material such as jute, cotton, paper, or other types of recyclable, biodegradable material.

In some embodiments, the flexible substrate may be placed on the ground or another surface such that the strings or cords are accessible. Yard debris may be placed on the flexible substrate and then the substrate may be folded around the yard debris and the strings may be coupled to the fasteners to compact and secure the yard debris within a bundle formed by the flexible substrate. In some embodiments, one of the strings or the fasteners may be offset from the edge of the substrate to facilitate compaction of the yard debris during a fastening operation.

In a particular example, the substrate may be substantially rectangular. The user may place the substrate on the ground and may stack yard debris on the substrate. The user may then pull the strings to draw one edge of the substrate toward an opposing edge. Each string may then be coupled to one of the fasteners and pulled tight to compact and secure the yard debris into a bundle that can be carried, stored temporarily, and subsequently disposed of or placed at the curb for waste management collection. One possible example of a bundling device is described below with respect to FIG. 1.

Figure 1:
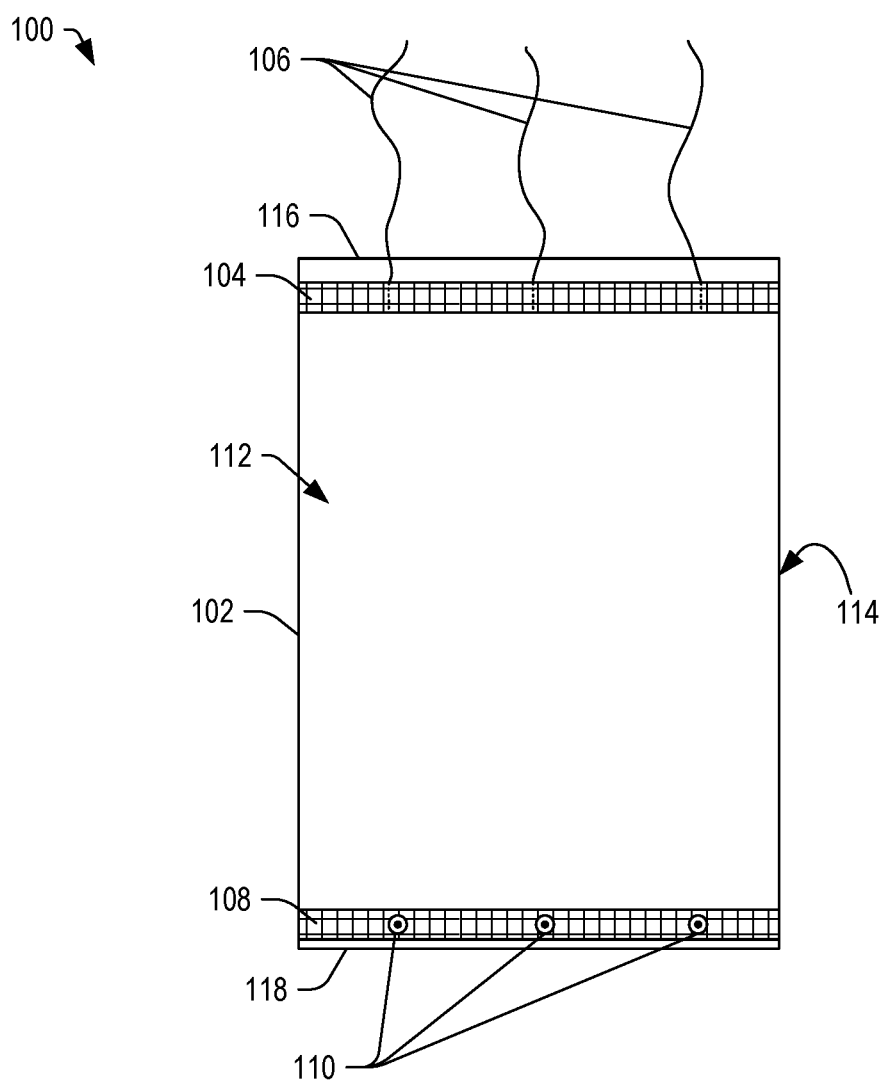
FIG. 1 depicts a diagram of a bundling device, in accordance with certain embodiments of the present disclosure.

FIG. 1 depicts a diagram of a bundling device 100, in accordance with certain embodiments of the present disclosure. The bundling device 100 may include a substrate 102, which may include a first reinforced area 104 near a first edge 116 of the substrate 102 and a second reinforced area 108 near a second edge 118 of the substrate 102 that is opposite to the first edge 116. Further, the bundling device 100 may include a plurality of strings 106, which may be coupled to the first reinforced area 104. The substrate 102 may also include a plurality of fasteners 110, which may be coupled to the second reinforced area 108.

In some embodiments, the first reinforced area 104 and the second reinforced area 108 may be formed by applying adhesive, tape, paper, fabric, another material, or any combination thereof to at least one of a first surface 112 and a second surface 114 of the substrate 102. In some embodiments, the substrate 102 may be formed from two material layers, and the first reinforced area 104 and the second reinforced area 108 may be formed by including or providing multiple additional layers between the two material layers. In some embodiments, at least one of the first reinforced area 104 and the second reinforced area 108 may be continuous or intermittent or may correspond to one of the attachment locations for the strings 106 or the fasteners 110. In some embodiments, the first and second reinforced areas 104 and 108 may provide a support for the substrate 102 in one or more localized areas that may correspond to the attachment locations of the strings 106 or the fasteners 110. Other embodiments are also possible.

In still other embodiments, the spacing between the first reinforced area 104 and the edge 116 may vary, depending on the implementation. Further, the spacing between the second reinforced area 108 and the edge 118 may vary, depending on the implementation. In certain embodiments, one or both of the first reinforced area 104 and the second reinforced area 108 may be moved away from or toward the associated edge 116 or 118. Other embodiments are also possible.

Figure 2A:
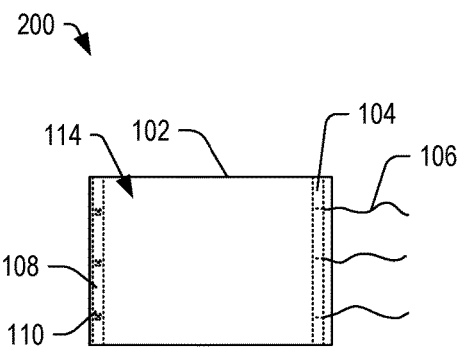
FIGS. 2A-2D depict diagrams of the bundling device of FIG. 1 in various stages of use, in accordance with certain embodiments of the present disclosure.

FIGS. 2A-2D depict diagrams of the bundling device of FIG. 1 in various stages of use, in accordance with certain embodiments of the present disclosure. In FIG. 2A, a top view 200 of the bundling device 100 of FIG. 1 is shown. The substrate 102 may be positioned on a surface, such as the ground, such that the second surface 114 is facing upward.

Figure 2B:
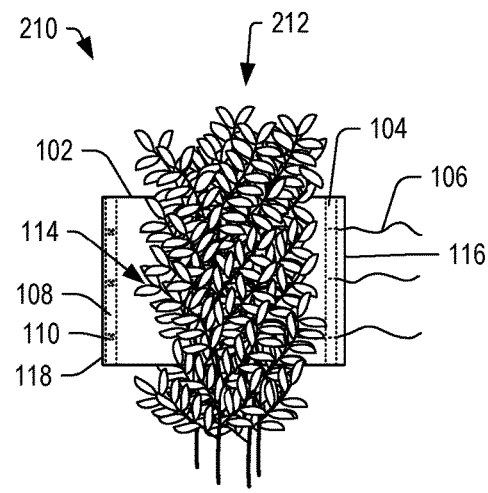

In FIG. 2B, a second view 210 is shown in which yard debris 212 is placed on the second surface 114. In some embodiments, the yard debris 212 may be arranged such that the length of the yard debris extends approximately parallel with the edges 116 and 118.

Figure 2C:
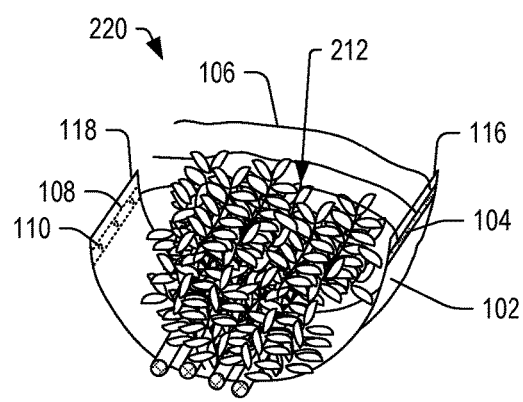

In FIG. 2C, a third view 220 is shown in which the edges 116 and 118 are drawn toward one another around the yard debris 212. In one example, the strings 106 may be pulled to draw the edge 116 toward the opposing edge 118.

Figure 2D:
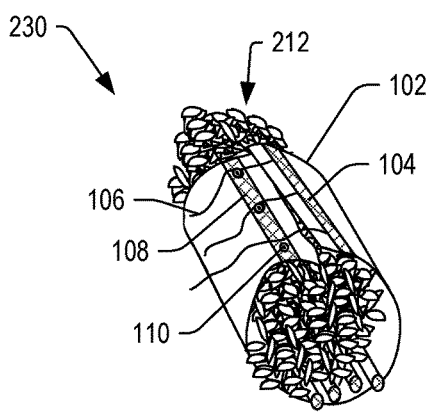

In FIG. 2D, a fourth view 230 is shown in which the strings 106 are wrapped around the fasteners 110 and pulled tight to compress and secure the yard debris 212. In this example, the fasteners 110 may be button or cufflink type fasteners about which the strings 106 may be wrapped to couple the substrate 102 about the yard debris 212.

In certain embodiments, once the strings 106 are coupled to the fasteners 110, the user may pick up the yard debris and move it by gripping the strings 106 and lifting the bundling device. In some examples, the user may partially raise one edge over a portion of the yard debris 212. The user may then kneel on the substrate 102 to compress the yard debris while using the strings 106 to raise the first edge 116. The user may then tie or wrap the strings 106 to the fasteners 110 to secure the yard debris 212. Other embodiments are also possible.

In some embodiments, the substrate 102 may be formed from paper, fabric, or another recyclable, biodegradable material. Further, in some embodiments, the substrate 102 may be a multi-layer substrate, which may be formed from multiple layers of the same material or multiple layers of different materials. In a particular example, the substrate 102 may be formed from at least two sheets of paper, which may be adhered together. Some examples of such a substrate 102 are described below with respect to FIGS. 3A-3C.

Figure 3A:
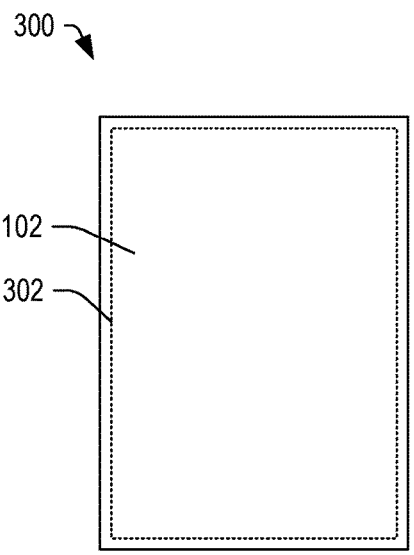
FIGS. 3A-3C depict diagrams of different embodiments of a multi-layer substrate of the bundling devices of FIGS. 1 and 2 including different adhesive configurations, in accordance with certain embodiments of the present disclosure.
Figure 3B:
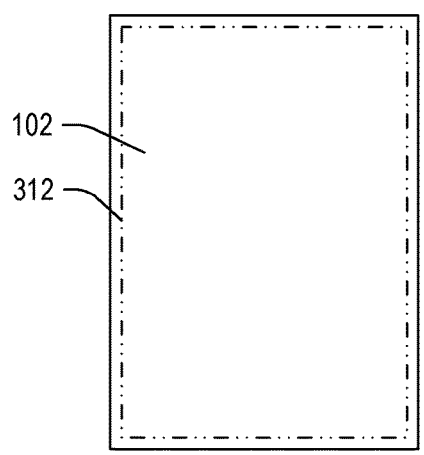
Figure 3C:
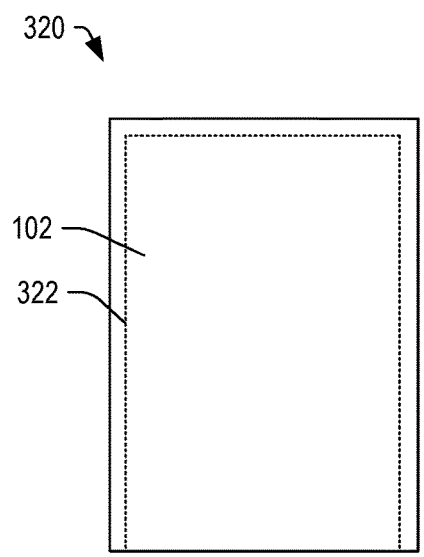

FIGS. 3A-3C depict diagrams of different embodiments of a multi-layer substrate of the bundling devices of FIGS. 1 and 2 including different adhesive configurations, in accordance with certain embodiments of the present disclosure. In FIG. 3A, a first view 300 is shown that includes a substrate 102 formed from multiple layers. The layers may be adhered together along the edges, as generally indicated by the dashed line at 302. In this example, the substrate 102 may include at least two material layers with adhesive disposed along the peripheral edges.

In FIG. 3B, a second view 310 is shown that includes a substrate 102 formed from multiple layers. The layers may be intermittently adhered along the edges, as generally indicated at 312. In a particular example, the adhesive may be applied intermittently near the edges.

In FIG. 3C, a third view is shown that includes a substrate formed from multiple layers that are adhered together along three of the four edges, as generally indicated at 322. In this example, the adhesive may be continuously or intermittently applied along three of the four edges.

Figure 4A:
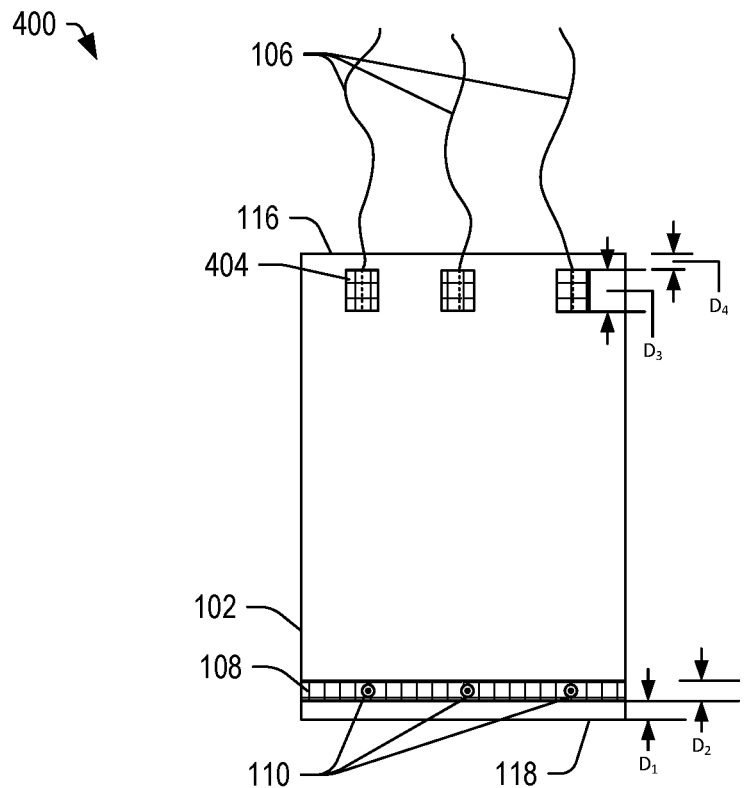
FIGS. 4A-4B depict diagrams of a bundling device, in accordance with certain embodiments of the present disclosure.
Figure 4B:
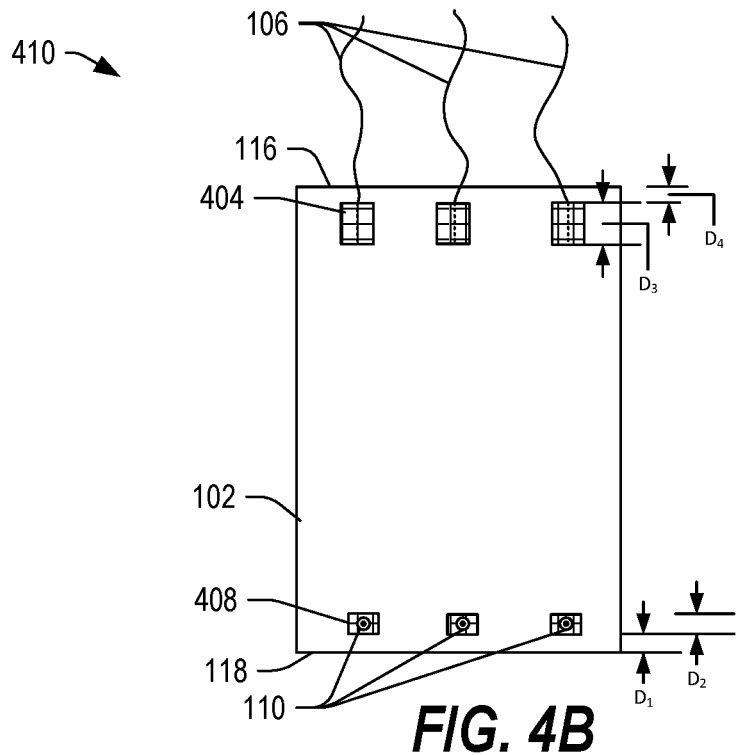

FIGS. 4A-4B depict diagrams of a bundling device, in accordance with certain embodiments of the present disclosure. In FIG. 4A, a first view is shown in which the first reinforced area 104 is omitted and is replaced with localized reinforced areas 404 corresponding to the attachment location of the strings 106. In this example, the localized reinforced areas 404 may be spaced apart from the edge 116 by a distance ($D_4$), which may be less than the width ($D_3$) of the localized reinforced area 404. Further, the second reinforced area 108 may have a width ($D_2$), which may be greater than the distance ($D_1$) between the second reinforced area 108 and the edge 118.

It should be appreciated that the widths of the localized reinforced areas 404 and the second reinforced area 108 may vary, depending on the implementation. Further, the distance between the localized reinforced areas 404 and the second reinforced area 108 and the corresponding edges 116 and 118 may also vary. Other embodiments are also possible.

In FIG. 4B, a second view 410 is shown in which the second reinforced area 108 has been omitted and replaced with localized reinforced areas 408, which may correspond to the attachment locations of the fasteners 110. In this example, the localized reinforced areas 404 may be spaced apart from the edge 116 by a distance ($D_4$), which may be less than the width ($D_3$) of the localized reinforced area 404. Further, the localized reinforced areas 408 may have a width ($D_2$), which may be greater than the distance ($D_1$) between the second reinforced area 108 and the edge 118.

In some embodiments, the distances D1 and D4 may be approximately equal, and the widths D2 and D3 may be the same or different. Other embodiments are also possible.

Figure 5A:
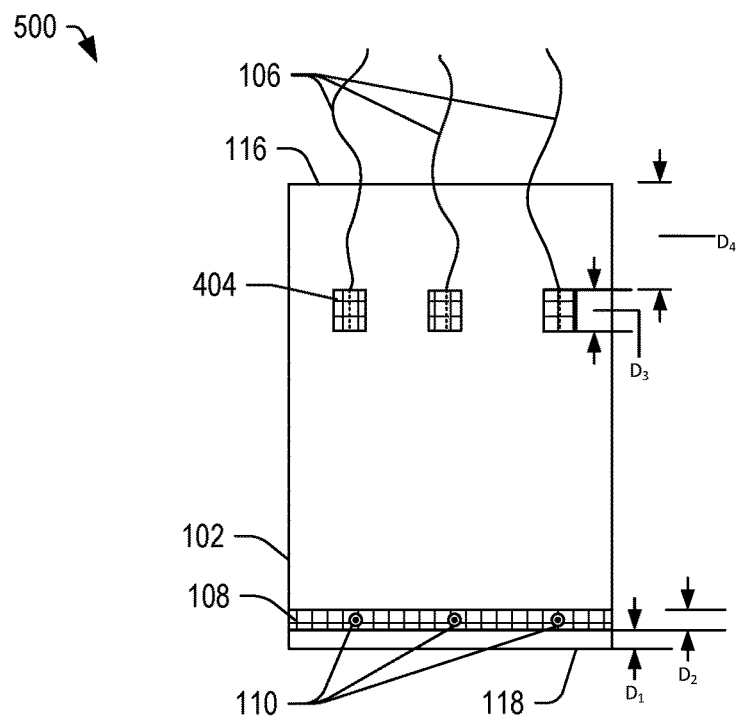
FIGS. 5A-5B depict diagrams of a bundling device, in accordance with certain embodiments of the present disclosure.
Figure 5B:
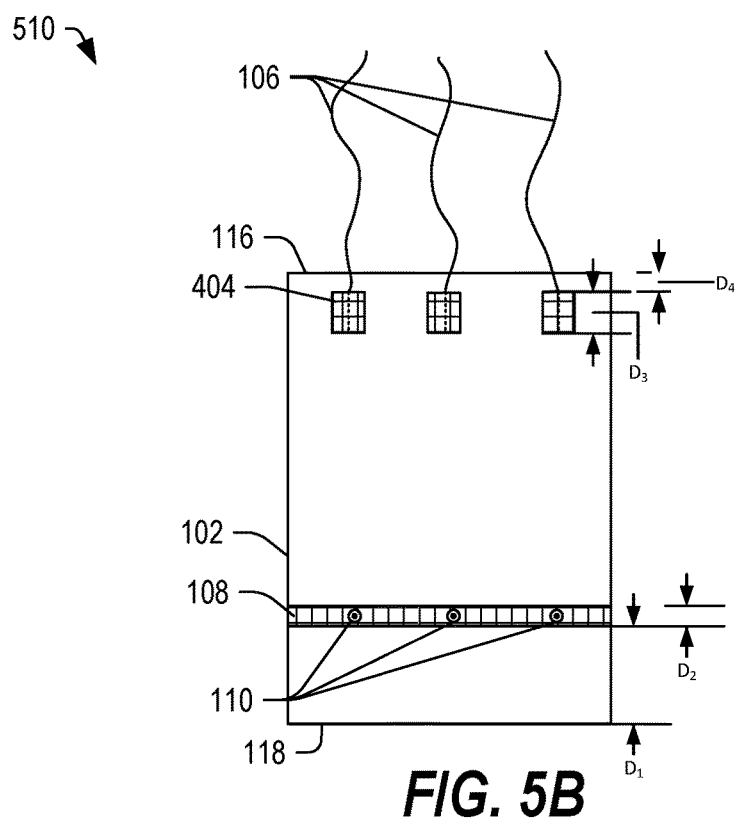

FIGS. 5A-5B depict diagrams of a bundling device, in accordance with certain embodiments of the present disclosure. FIG. 5A presents a view 500 corresponding to a version of the bundling device of FIG. 4A in which the localized reinforced areas 404 have been moved relative to the edge 116. In this example, the distance ($D_4$) between the edge 116 and the localized reinforced area 404 is increased, such that the distance ($D_4$) is greater than the width ($D_3$) of the localized reinforced area 404.

FIG. 5B presents a view 510 corresponding to a version of the bundling device of FIG. 4A in which the second reinforced area 108 has been moved away from the edge 118 and toward the edge 116. In this example, the distance ($D_1$) between the edge 118 and the second reinforced area 108 is increased, such that the distance ($D_1$) is greater than the width ($D_2$) of the second reinforced area 108.

By moving at least one of the localized reinforced areas 404 and the second reinforced area 108 away from the corresponding edge 116 or 118, compression of the yard debris 212 may be enhanced. In particular, by moving the reinforced areas 404 or 108, which correspond to one of the attachment locations for the strings or the fasteners, the compression of the yard debris 212 may be enhanced.

Figure 6A:
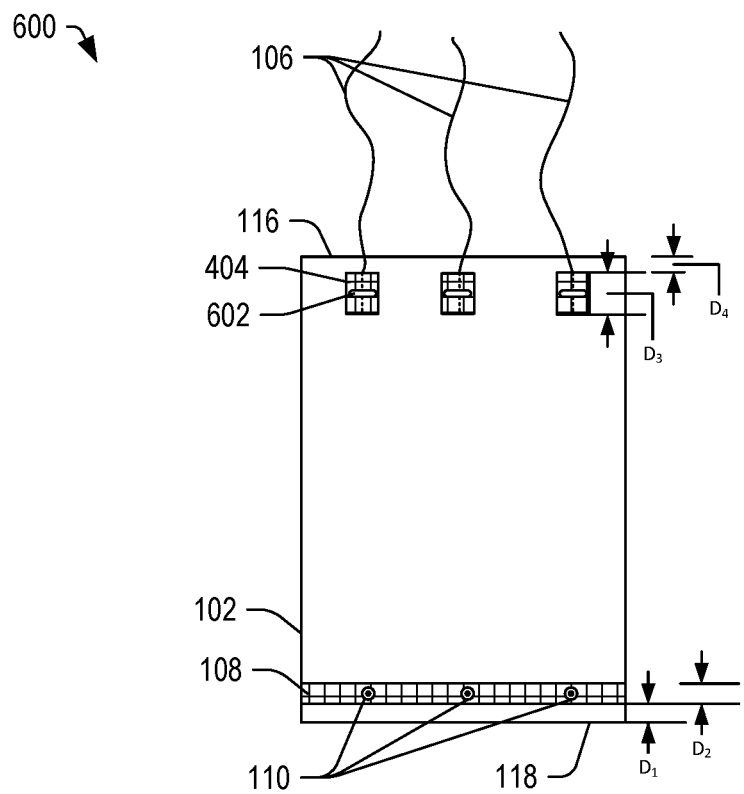
FIGS. 6A-6B depict diagrams of a bundling device, in accordance with certain embodiments of the present disclosure.
Figure 6B:
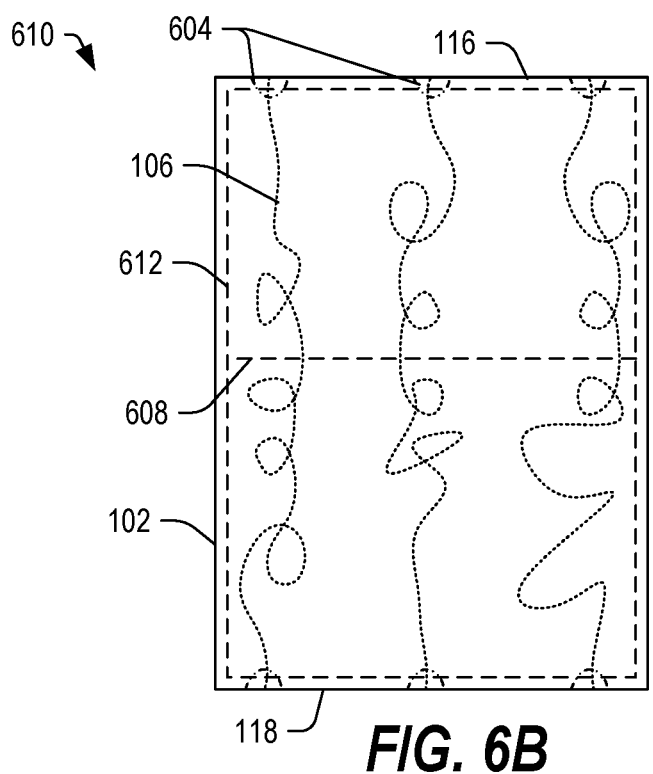

FIGS. 6A-6B depict diagrams of a bundling device, in accordance with certain embodiments of the present disclosure. FIG. 6A presents a view 600 corresponding to a version of the bundling device of FIG. 4A in which the localized reinforced areas 404 may further include holes 602 sized to serve as handles. In this example, the holes 602 may be provided at a midpoint of the reinforced area 404 to facilitate carrying of the bundling device once the strings 106 are coupled to the fasteners 110.

In FIG. 6B, a view 610 is shown in which the strings 106 may be contained within the four corners of the substrate 102. In this example, the substrate 102 may include at least two layers adhered along the peripheral edges, as generally indicated by the dashed lines 612. The adhesive and the layers of the substrate 102 may cooperate to form an enclosure. Multiple strings 106 may extend from the first edge 116 to the second edge 118 within the enclosure and may be attached to the two layers along the peripheral edges. Further, tear lines 604 may be provided that extend from the edges 116 and 118 toward a center of the substrate 102 and back to the edges 116 and 118, which tear lines 604 may be used to expose the strings 106 and to form end tabs to facilitate coupling of the strings 106 at both ends. A user may tear the substrate 102 along the tear lines 604 and pull to extend the string 106.

In some embodiments, adhesive may also be placed along line 608. The adhesive line 608 may provide a second attachment point for the layers of the substrate 102 and may secure at least a portion of the string 106 within the enclosure so that a user may not pull the string entirely out of the enclosure. Further, the adhesive line 608 may also facilitate application of compressive force on the debris 212, by producing a hoop stress in response to tension applied to the strings 106. Other embodiments are also possible.

Figure 7A:
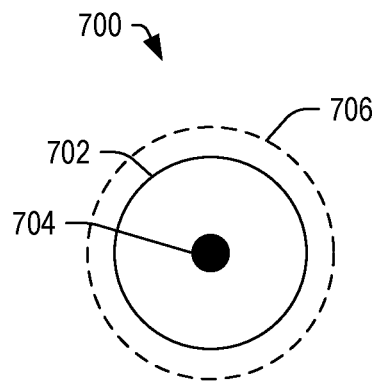
FIGS. 7A-7D depict different embodiments of fasteners that can be used in conjunction with the bundling devices of FIGS. 1-2D and 4A-6B, in accordance with certain embodiments of the present disclosure.

FIGS. 7A-7D depict different embodiments of fasteners 110 that can be used in conjunction with the bundling devices of FIGS. 1-2D and 4A-6B in accordance with certain embodiments of the present disclosure. In FIG. 7A, a fastener 700 is shown, which may include a first disk-shaped element 702 coupled to the substrate 102 by adhesive, a clasp, a rivet, a string 704, or any other type of coupling material or coupling device. In some embodiments, the clasp or rivet may be formed of plastic or metal. In some embodiments, a second disk-shaped element 706 may be provided on an opposite side of the substrate 102 and attached to the first disk-shaped element 702 by the clasp or rivet 704. Other embodiments are also possible.

Figure 7B:
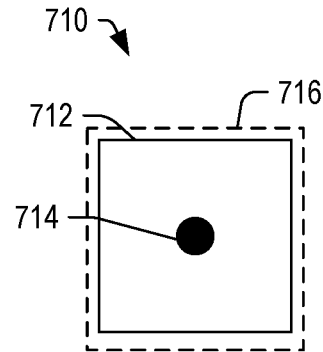

In FIG. 7B, a fastener 710 is shown that may include a square-shaped element 712 coupled to the substrate 102 by adhesive, a clasp, a rivet, a string 714, or any other type of coupling material or coupling device. In some embodiments, the clasp or rivet may be formed of plastic or metal. In some embodiments a second square-shaped element 716 may be provided on an opposite side of the substrate 102 and attached to the first square-shaped element 712 by the clasp or rivet 714. Other embodiments are also possible.

Figure 7C:
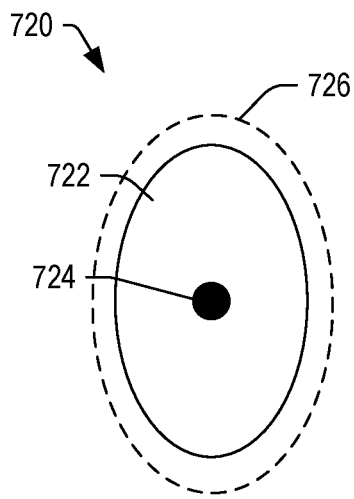

In FIG. 7C, a fastener 720 is depicted as including an elliptical-shaped element 722 coupled by adhesive, a clasp, a rivet, a string 724, or any other type of coupling material or coupling device to the substrate 102. A second elliptical element 726 may be provided on the opposite side of the substrate 102 and attached by the clasp or rivet 724. Other embodiments are also possible.

Figure 7D:
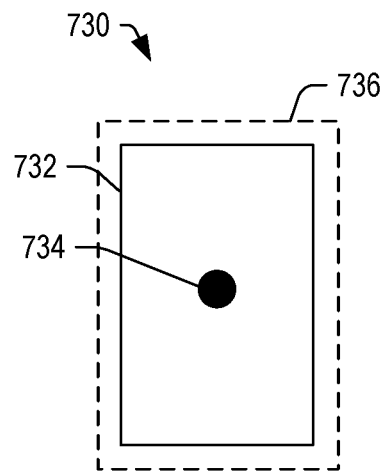

In FIG. 7D, a fastener 730 is shown that may include a rectangular-shaped element 732 coupled by adhesive, a clasp, a rivet, a string 734, or any other type of coupling material or coupling device to the substrate 102. A second rectangular element 736 may be provided on the opposite side of the substrate 102 and attached by the clasp or rivet 734. Other embodiments are also possible.

It should be understood that the fastener 110 in FIGS. 1-2D and 4A-6B may be implemented using any number of different shapes or combinations of shapes. In a particular example, the shapes depicted in FIGS. 7A-7D may be used together. In some embodiments, the second fasteners 706, 716, 726, and 736 may be larger than and substantially the same shape as the fasteners 702, 712, 722, and 732. In some embodiments, the shapes may be mixed and matched. In an example, the second fastener 716 may be used in conjunction with the fastener 702. Other combinations of shapes are also possible.

Figure 8A:
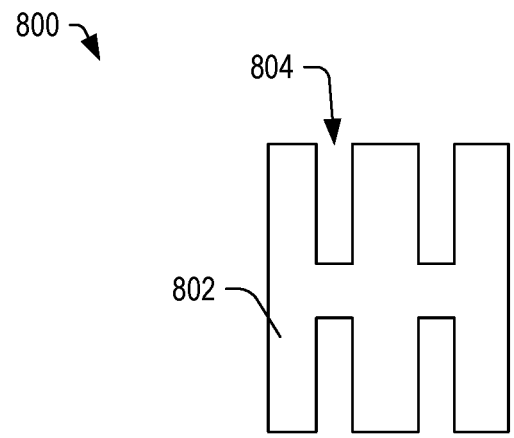
FIGS. 8A-8B depict different embodiments of fasteners that can be used in conjunction with the bundling devices of FIGS. 1-2D and 4A-6B, in accordance with certain embodiments of the present disclosure.
Figure 8B:
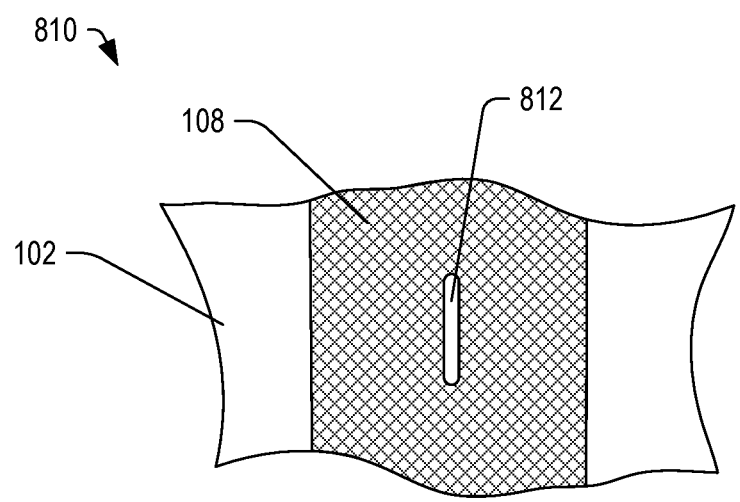

FIGS. 8A-8B depict fasteners, such as the fastener 110, that can be used in conjunction with bundling devices of FIGS. 1-6B. In FIG. 8A, a fastener 800 is shown that includes a comb-like device with tightly spaced teeth 802 and spaces 804 in between the teeth 802 to receive the string 106. In some embodiments, the fastener 800 may be made from recyclable material, biodegradable material, or any combination thereof. Such material can include cardboard, wood, multi-layered paper, or another material. In some embodiments, the fastener 800 may be coupled to the substrate 102 by adhesive, by a plastic or metal clasp or bolt, by string, or any other type of coupling material or coupling device. In some examples, the fastener 800 can have a rectangular, square, round, oval, or another shape.

In FIG. 8B, a fastener 810 is shown that can be implemented as a slit or cut-through 812 in the substrate 102 through which the string 106 may be fed. In some embodiments, reinforcing adhesive, resin, or other material may be added about the slit or cut-through 812 to prevent tearing. In this example, the slit or cut-through 812 may be provided in the reinforced area 108, which may be formed by including additional layers or by adding tape or another reinforcing matrix to the substrate 102.

Figure 9A:
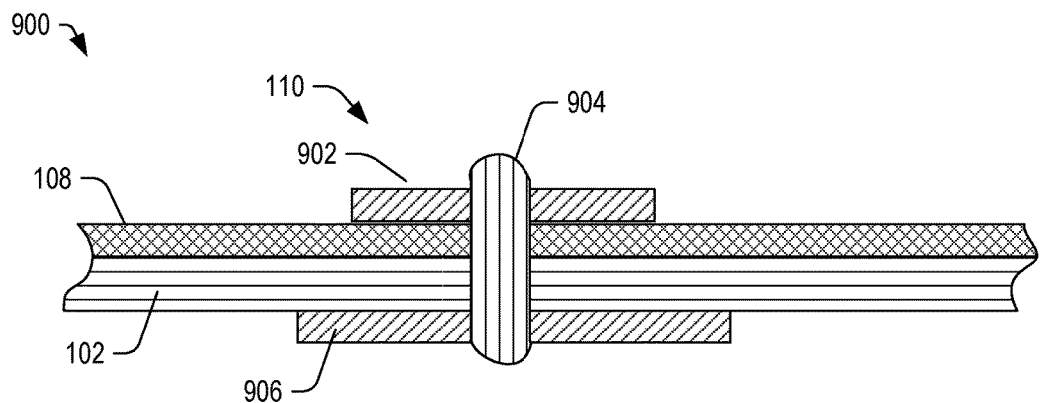
FIG. 9A depicts an embodiment of a portion of a fastener including a pair of fastener elements on opposing sides of a substrate of a bundling device, in accordance with certain embodiments of the present disclosure.

FIG. 9A depicts an embodiment of a portion of an apparatus 900 including a fastener 110 including a pair of fastener elements 902 and 906 on opposing sides of a substrate 102 of a bundling device, in accordance with certain embodiments of the present disclosure. In this example, a first fastener element 902 may be coupled by an attachment device 904 to a reinforced area 108 that is coupled to the substrate 102. The attachment device 904 may extend through the reinforced area 108, through the substrate 102, and through a second fastener element 906. The attachment device 904 may be a clasp, a rivet, a string, or another element configured to couple the first fastener element 902 and the second fastener element 906 to one another and to the substrate 102. Other embodiments are also possible.

Figure 9B:
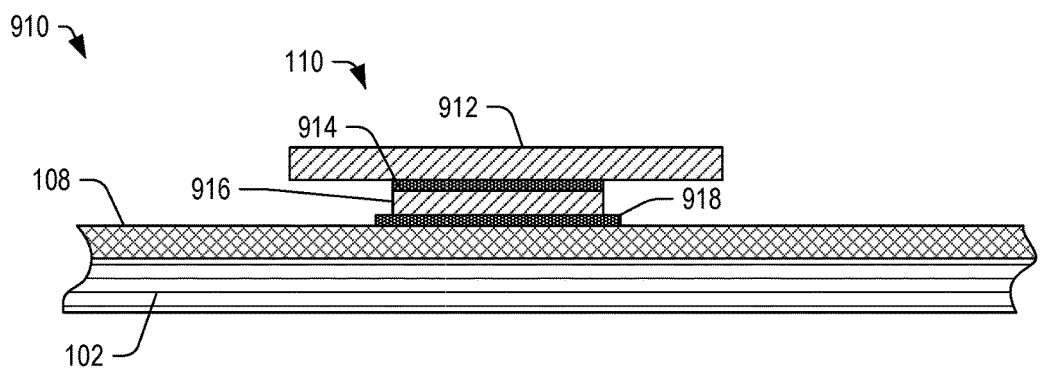
FIG. 9B illustrates an embodiment of a portion of a fastener including a multi-layer fastener element, in accordance with certain embodiments of the present disclosure.

FIG. 9B illustrates a portion of an apparatus 910 including a fastener 110 including a multi-layer fastener element, in accordance with certain embodiments of the present disclosure. In this example, the fastener 110 may include a first element 912, which may be coupled to a spacer 916 by an adhesive 914. The spacer 916 may be coupled to the reinforced area 108 by an adhesive 918. Other embodiments are also possible.

In some embodiments, the reinforced area 108 may be selected as a material or matrix to which the adhesive 918 and 914 may adhere. In an example, the reinforced area 108 may include porous openings configured to absorb the adhesive 918 to facilitate a strong adhesive bond.

Figure 9C:
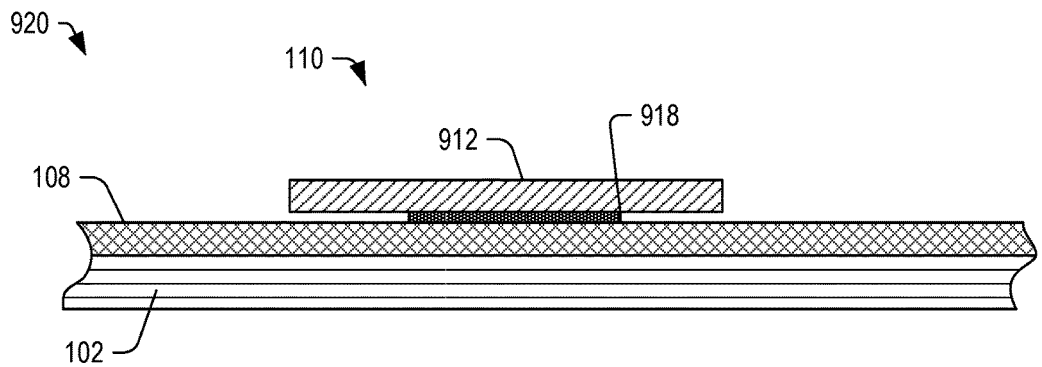
FIG. 9C depicts an embodiment of a portion of a fastener coupled to the substrate, in accordance with certain embodiments of the present disclosure.

In FIG. 9C, a view 920 is shown in which the fastener 110 is adhered to the substrate 102 by an adhesive 918. The fastener 110 may be in contact with the substrate 102 and may be sufficiently flexible to allow a string to be wrapped between the fastener 110 and the substrate 102 and around the adhesive 918. In an alternative embodiment involving a coupling device, such as a rivet, clasp, string or other device, the string may be wrapped between the fastener 110 and the substrate 102 and around the coupling device 918.

Figure 10:
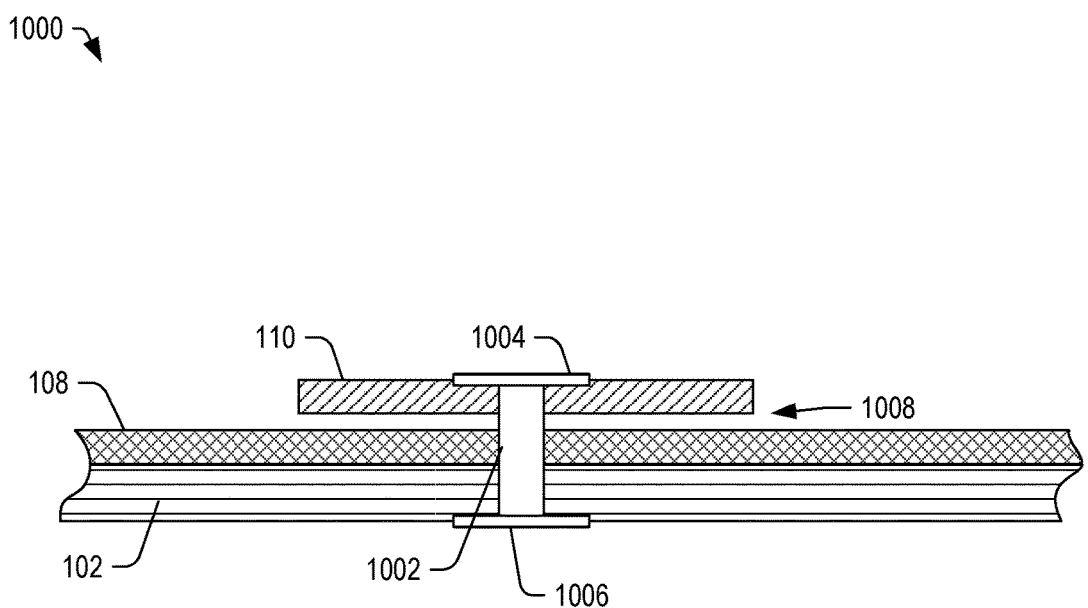
FIG. 10 depicts an embodiment of a portion of an apparatus including a fastener, in accordance with certain embodiments of the present disclosure.

FIG. 10 depicts an embodiment of a portion of an apparatus 1000 including a fastener 110 coupled to the substrate 102, in accordance with certain embodiments of the present disclosure. In the illustrated example, the portion of the apparatus 1000 may include the substrate 102 and a reinforced portion 108. In this example, the fastener 110 may be coupled to the substrate 102 and through the reinforced portion 108 by a rivet, which may include a cylindrical portion 1002, a head 1004 that may contact the substrate 102, and a tail 1006 that may contact an opposing surface of the substrate 102 (opposite the side that contacts the reinforced portion 108). In some embodiments, there may be an air gap or space 1008 between the fastener 110 and the reinforced portion 108 or the substrate 102. The space 1008 may allow room for the second end of the string 106 to fit between the fastener 110 and the surface of the substrate 102 or the reinforced portion 108.

It should be understood that the rivet 1002, the head 1004, and the tail 1006 may be formed from metal, plastic, another material, or any combination thereof. Further, it should be appreciated that the rivet 1002, the head 1004, and the tail 1006 may be used to attach the fastener 110 in any of the embodiments described above with respect to FIGS. 1-9C.

Figure 11A:
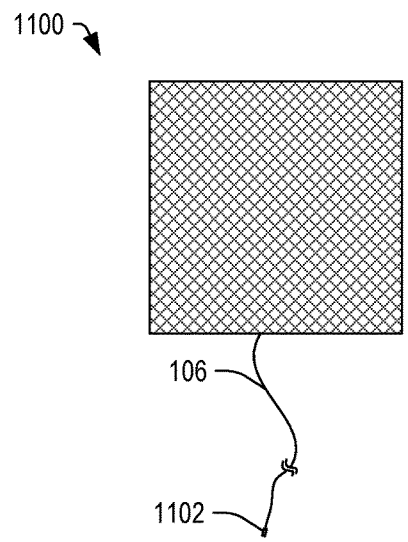
FIG. 11A depicts an embodiment of a portion of an apparatus including a fastener, in accordance with certain embodiments of the present disclosure.

FIG. 11A depicts an apparatus 1100 including a string 106 including an end coupled to a fastener 1102, in accordance with certain embodiments of the present disclosure. In some embodiments, the end of the string 106 may include an aglet, such as the end of a shoelace. In other embodiments, the end of the string 106 may include a knot or other fastening element. Alternatively, the fastener 1102 may include a mechanically adjustable element, which can be used to secure the end of the string 106. Examples of possible embodiments of the fastener 1102 are described below with respect to FIGS. 11B-11E.

Figure 11B:
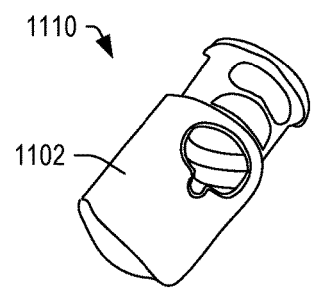
FIGS. 11B-11E illustrate different embodiments of fasteners for the end of the string of FIG. 11A, in accordance with certain embodiments of the present disclosure.

FIGS. 11B-11E illustrate different fasteners 1102 for the end of the string 106 of FIG. 11A, in accordance with certain embodiments of the present disclosure. In FIG. 11B, the fastener 1102 may include an opening sized to receive the end of the string 106 and a button that can be depressed to release pressure on the string 106 during adjustment. Releasing the button may cause a spring within the fastener 1102 to mechanically restrict the opening to secure the string 106.

Figure 11C:
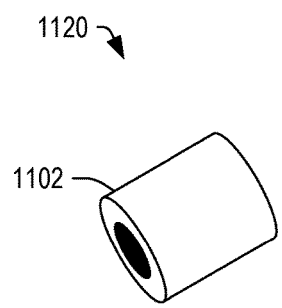

In FIG. 11C, a fastener 1102 is shown, which may include an opening sized to receive the string 106. Once the string 106 is fed into and through the opening (which defines a channel or path through the body of the fastener 1102, the string 106 may be knotted to secure the fastener 1102 on the string 106.

Figure 11D:
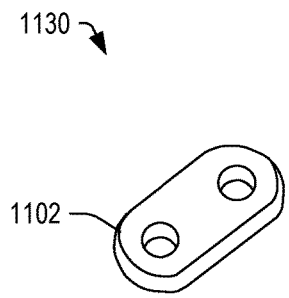

In FIG. 11D, a fastener 1102 is depicted that includes two opening sized to receive the string 106 in a threaded fashion. Friction between the substrate, the openings, and the string 106 may secure the fastener 1102 to the string 106.

Figure 11E:
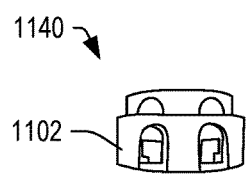

In FIG. 11E, a fastener 1102 is shown that includes two openings that can be accessed by depressing a button of the fastener to align the openings. The string 106 may be fed through one hole and through the other hole while the button is depressed. The button may then be released, causing a spring within the fastener 1102 to extend to trap the string 106.

In some embodiments, the fasteners 1102 may be used in conjunction with the slit or with other fasteners, as described above, to secure the substrate 102 in a wrapped configuration to compress, bundle, and secure yard debris. Other embodiments are also possible.

In conjunction with the apparatuses and fasteners described above with respect to FIGS. 1-11E, a debris bundling device is described that includes one or more strings extending from a first end of the substrate and one or more fasteners Although the present invention has been described with reference to preferred embodiments, workers skilled in the art will recognize that changes may be made in form and detail without departing from the scope of the invention.

What is claimed is:

1. A debris bundling device comprising:
   a substrate including at least one edge, the substrate formed from a flexible material;
   a plurality of strings, each string including a first end coupled to the substrate and including a second end; and
   a plurality of fasteners coupled to the substrate, each fastener configured to engage the second end of one of the plurality of strings to secure the substrate in a wrapped state, one or more of the plurality of fasteners comprises a first element forming a button-like shape coupled to a first surface of the substrate by at least one of an adhesive and a coupling device.

2. The debris bundling device of claim 1, wherein the plurality of strings, the substrate, and the plurality of fasteners cooperate to compress and secure debris within an enclosure formed by bending the substrate around the debris.

3. The debris bundling device of claim 1, further comprising a second element coupled to a second surface of the substrate opposite to the first surface and coupled to the first element through the first surface by the coupling device.

4. The debris bundling device of claim 1, further including at least one reinforced area adjacent to at least one of a coupling location of each of the plurality of string and a coupling location of each of the plurality of fasteners.

5. The debris bundling device of claim 4, further including an opening in the at least one reinforced area configured to serve as a handle.

6. The debris bundling device of claim 1, wherein the substrate is formed from at least one layer of a flexible material.

7. The debris bundling device of claim 6, wherein the at least one layer includes multiple layers and further includes an adhesive disposed between the multiple layers adjacent to the at least one edge.

8. The debris bundling device of claim 1, wherein the substrate has a substantially rectangular shape.

9. A debris bundling device comprising:
a substrate having a substantially rectangular shape;
a first reinforced area extending parallel to a first edge of the substrate;
a plurality of strings, each string including a first end coupled to the substrate by the first reinforced area and including a second end;
a second reinforced area extending parallel to a second edge of the substrate, the second edge opposite to the first edge; and
a plurality of fasteners, each fastener configured to receive and secure the second end of one of the plurality of strings, one or more of the plurality of fasteners comprises a first element forming a button-like shape coupled to a first surface of the substrate by at least one of an adhesive and a coupling device.

10. The debris bundling device of claim 9, further comprising a second element coupled to a second surface of the substrate opposite to the first surface and coupled to the first element through the substrate by the coupling device.

11. The debris bundling device of claim 9, wherein the substrate is formed from at least one layer.

12. The debris bundling device of claim 11, wherein the at least one layer includes multiple layers and further includes an adhesive disposed between the multiple layers adjacent to the at least one edge.

13. The debris bundling device of claim 11, wherein the substrate is formed from at least one of a recyclable material and a biodegradable material.

14. A debris bundling device comprising:
a substrate formed from a flexible material, the substrate having a substantially rectangular shape including a plurality of edges;
a plurality of strings, each string including a first end and a second end, the first end coupled to the substrate adjacent to a first edge of the plurality of edges; and
a plurality of fasteners, each fastener coupled to the substrate adjacent to a second edge of the plurality of edges, each fastener configured to engage the second end of one of the plurality of strings to secure the substrate in a wrapped state, one or more of the plurality of fasteners comprises a first element forming a button-like shape coupled to a first surface of the substrate by at least one of an adhesive and a coupling device.

15. The debris bundling device of claim 14, wherein the second edge is opposite the first edge about the substantially rectangular shape.

16. The debris bundling device of claim 14, further including a reinforced area extending parallel to the second edge of the substrate and configured to reinforce a coupling of each of the plurality of fasteners.

17. The debris bundling device of claim 14, wherein the substrate includes multiple layers and further includes an adhesive disposed between the multiple layers adjacent to the first edge to couple the plurality of strings to the substrate.

* * * * *